(12) United States Patent
Boyer et al.

(10) Patent No.: US 8,360,905 B2
(45) Date of Patent: Jan. 29, 2013

(54) CHROMATIC ARCHITECTURE FOR SPORTS EQUIPMENT

(75) Inventors: Clancy G. Boyer, Aloha, OR (US); Richard G. Avis, Tigard, OR (US); Alan W. Reichow, Forest Grove, OR (US); Karl Citek, Forest Grove, OR (US)

(73) Assignee: Nike, Inc., Beaverton, OR (US)

( * ) Notice: Subject to any disclaimer, the term of this patent is extended or adjusted under 35 U.S.C. 154(b) by 0 days.

(21) Appl. No.: 10/770,862

(22) Filed: Feb. 2, 2004

(65) Prior Publication Data

US 2005/0170920 A1    Aug. 4, 2005

(51) Int. Cl.
*A63B 41/08*    (2006.01)
(52) U.S. Cl. .......................... 473/604; 40/327
(58) Field of Classification Search ............ 473/280, 473/446, 603, 604, 569, 607, 598; 40/327; D21/712, 713
See application file for complete search history.

(56) References Cited

U.S. PATENT DOCUMENTS

| | | | | |
|---|---|---|---|---|
| 676,506 | A | * | 6/1901 | Knight et al. .................. 40/327 |
| D45,734 | S | | 5/1914 | Worthington |
| 1,187,029 | A | | 6/1916 | Beebout |
| D194,688 | S | | 2/1963 | Santora |
| 3,425,693 | A | | 2/1969 | Murray |
| 3,861,790 | A | | 1/1975 | Tamura |
| 4,170,352 | A | | 10/1979 | Vcala |
| 4,345,759 | A | | 8/1982 | Nims |
| 4,596,389 | A | * | 6/1986 | Frankowski .................. 473/609 |
| 4,660,834 | A | * | 4/1987 | Carrigan ...................... 473/610 |
| 4,796,888 | A | * | 1/1989 | Louez ............................ 40/327 |
| 4,991,838 | A | | 2/1991 | Groves |
| 5,050,982 | A | | 9/1991 | Meissner |
| 5,067,719 | A | * | 11/1991 | Mook ............................ 40/327 |
| 5,230,512 | A | | 7/1993 | Tattershall |
| 5,419,552 | A | | 5/1995 | Meyer |
| 5,427,372 | A | * | 6/1995 | Ratner et al. .................. 473/597 |
| 5,470,058 | A | * | 11/1995 | Sullivan et al. ............... 473/570 |
| 5,478,239 | A | | 12/1995 | Fuerst |
| 5,564,707 | A | | 10/1996 | Dinh |
| 5,711,725 | A | | 1/1998 | Bengtson |
| D393,020 | S | | 3/1998 | Arcos |
| 5,741,195 | A | | 4/1998 | Sullivan |

(Continued)

FOREIGN PATENT DOCUMENTS

FR    2358904 A    2/1978
WO    WO98/26326    6/1998

OTHER PUBLICATIONS

PCT/US2005/002904, Jan. 31, 2005, International Search Report, Applicant: Nike International Ltd.

(Continued)

*Primary Examiner* — Steven Wong
(74) *Attorney, Agent, or Firm* — Shook, Hardy & Bacon L.L.P.

(57) ABSTRACT

Sporting items such as soccer balls include a casing region and a graphic region that are defined by enhanced-visibility colors (EVCs) that are substantially complementary. Such EVCs can be selected to avoid colors associated with color confusion in color deficient individuals. In addition, such colors can be selected based on total reflectances to obtain a predetermined luminance contrast. EVCs can be selected based on separations of color coordinate locations using CIE chromaticity coordinates or CIE L-a-b coordinates or otherwise selected. Color selection can include consideration of anticipated viewing backgrounds in a general setting, or colors can be customized for a particular location and particular illumination conditions.

23 Claims, 11 Drawing Sheets

U.S. PATENT DOCUMENTS

| | | | |
|---|---|---|---|
| 5,778,793 | A | 7/1998 | Mello et al. |
| 5,842,866 | A | 12/1998 | Chow |
| D414,229 | S * | 9/1999 | Sohn .................... D21/709 |
| 6,331,151 | B2 | 12/2001 | Calandro |
| D453,037 | S | 1/2002 | Frisina |
| 6,375,783 | B1 | 4/2002 | Davis |
| 6,422,949 | B1 * | 7/2002 | Byrne et al. ............. 473/200 |
| 6,752,732 | B2 | 6/2004 | Morrison et al. |
| 6,755,525 | B2 | 6/2004 | Reichow |
| 6,811,258 | B1 | 11/2004 | Grant |
| D501,900 | S * | 2/2005 | Gammon, Jr. ........... D21/708 |
| 6,893,127 | B2 | 5/2005 | Reichow |
| D512,472 | S | 12/2005 | Nishihara |
| 7,073,208 | B2 | 7/2006 | Penque, Jr. |
| D529,107 | S | 9/2006 | Just |
| 7,167,246 | B1 | 1/2007 | Skierski |
| 7,241,234 | B2 * | 7/2007 | Eite ........................ 473/446 |
| D548,292 | S | 8/2007 | Smith |
| D548,806 | S | 8/2007 | Smith |
| D575,364 | S | 8/2008 | Smith |
| 7,568,986 | B2 * | 8/2009 | Watanabe et al. ........ 473/378 |
| 2002/0032076 | A1 * | 3/2002 | Isogawa et al. .......... 473/351 |
| 2003/0198924 | A1 | 10/2003 | Eite |
| 2005/0170920 | A1 | 8/2005 | Boyer et al. |
| 2005/0221919 | A1 | 10/2005 | Eite |
| 2006/0035723 | A1 | 2/2006 | Chapman |
| 2007/0049433 | A1 | 3/2007 | Laliberty et al. |
| 2007/0084095 | A1 | 4/2007 | Wellington |
| 2008/0076610 | A1 | 3/2008 | Torres |

OTHER PUBLICATIONS

Reichow, et al., "Introduction to Behavioral Optometry", Sports Vision, 1993, 75 pages, Optometric Extension Program Foundation, United States.

Ferreira, "An Overview of Research in Sports Vision: its History and an Optometric Perspective", The South African Optometrist, Dec. 2003, pp. 142-149, vol. 62, No. 4, Auckland Park, South Africa.

Coffey, et al., "Visual Performance Enhancement in Sports Optometry", Sports Vision 1995, pp. 158-177, Butterworth-Heinermann, United States.

Cardall, "Contact Lenses in Sport: a General Overview", Optician, Jan. 13, 2006, pp. 22-25, vol. 231, No. 6034, United States.

Rouse, et al., "A Comparison Study of Dynamic Visual Acuity Between Athletes and Nonathletes", Journal of the American Optometric Association, Dec. 1988, pp. 946-950, vol. 59, No. 12, United States.

Koenig, "Practicing Perception: Eyes Can Be Trained to be More Effective", USA Today Baseball Weekly, 1996, 3 pages, United States.

Coffey, et al., "Optometric Evaluation of the Elite Athlete," Problems in Optometry, Mar. 1990, pp. 32-59, vol. 2, No. 1, United States.

Reichow, et al., "A Comparison of Contrast Sensitivity in Elite Athletes Versus a Normal Population", American Journal of Optometry and Physiological Optics, Dec. 15, 1986, vol. 63, No. 82, United States.

Farrow, et al., "An Investigation of the Effectiveness of Bolle's Competivision Sport-Glasses on Tennis Performance", Clinical and Experimental Optometry, Jul.-Aug. 2000, pp. 226-231, vol. 83, No. 4.

Herdman, et al., "Computerized Dynamic Visual Acuity Test in the Assessment of Vestibular Deficits", The American Journal of Otology, 1998, pp. 790-796, vol. 19, No. 6, United States.

Tian, et al., "Dynamic Visual Acuity During Transient and Sinusoidal Yaw Rotation in Normal Ulilaterally Vestibulopathic Humans", Experimental Brain Research, Feb. 8, 2001, pp. 12-25, vol. 137, Springer-Verlag, United States.

Reichow, et al., "Ultraviolet and Short Wavelength Visible Light Exposure: Why Ultraviolet Protection Alone is Not Adequate", Journal of Long-Term Effects of Medical Implants, 2006, pp. 315-325, vol. 16, No. 4, Begell House, Inc., United States.

Advisory Action mailed Feb. 19, 2010 for U.S. Appl. No. 11/942,520, filed Nov. 19, 2007.

International Search Report mailed Sep. 7, 2006 for Appl. No. PCT/U05/04526, filed Feb. 9, 2005.

International Search Report mailed Sep. 5, 2008 for Appl. No. PCT/US08/634425, filed May 12, 2008.

Non-Final Office Action mailed Jun. 4, 2009 for U.S. Appl. No. 11/801,931, filed May 11, 2007.

Non-Final Office Action mailed Jul. 28, 2009 for U.S. Appl. No. 11/942,520, filed Nov. 19, 2007.

Non-Final Office Action mailed Oct. 8, 2009 for U.S. Appl. No. 11/801,931, filed May 11, 2007.

Non-Final Office Action mailed Dec. 15, 2009 for U.S. Appl. No. 11/717,894, filed Mar. 13, 2007.

Final Office Action mailed Sep. 2, 2010 for U.S. Appl. No. 11/717,894, filed Mar. 13, 2007.

Non Final Office Action mailed Mar. 25, 2010 for U.S. Appl. No. 11/717,894, filed Mar. 13, 2007.

Non Final Office Action mailed Oct. 7, 2010 for U.S. Appl. No. 11/942,520, filed Nov. 19, 2007.

Final Office Action mailed Apr. 22, 2010 for U.S. Appl. No. 11/801,931, filed May 11, 2007.

Final Office Action mailed Mar. 11, 2011 for U.S. Appl. No. 11/942,520, filed Nov. 19, 2007.

Notice of Allowance mailed Feb. 16, 2011 for U.S. Appl. No. 11/717,894, filed Mar. 13, 2007.

Final Office Action of Sep. 22, 2011 for U.S. Appl. No. 11/801,931, filed May 11, 2007.

Non Final Office Action mailed Apr. 6, 2011 for U.S. Appl. No. 11/801,931, filed May 11, 2007.

* cited by examiner

CHROMATIC ARCHITECTURE FOR SPORTS EQUIPMENT

TECHNICAL FIELD

The disclosure pertains to sports equipment having high visibility.

BACKGROUND AND SUMMARY

Individual effectiveness in performing physical tasks frequently depends upon an individual's visual skills, such as acuity, contrast sensitivity, and depth perception. For example, skilled crafts such as welding, cabinetmaking, and jewelry-making require accurate perception of objects. Recreational activities such as team and individual sports as well as outdoor recreational pursuits such as mountain climbing and hunting rely on visual performance. For many activities, enhancement of visual skills such as color contrast sensitivity and depth perception is desirable.

Specially adapted optical filters have been suggested that transmit more light at wavelengths overlapping a wavelength range in which a colored object reflects or emits light. See, for example, Moore et al., PCT App. No. PCT/US96/19761. In one example, Moore et al. suggest applying a blue dye to a transparent lens for enhanced viewing of an optic yellow tennis ball. In other examples, so-called "brighteners" are added to improve object visibility. For example, a golf ball cover can include a dye that absorbs radiation at blue or ultraviolet wavelengths in order to produce radiation at longer wavelengths to which the eye is more sensitive, thereby making the golf ball appear whiter.

In many sporting activities, a ball or other object moves rapidly and experiences frequent, rapid accelerations and decelerations. A participant's ability to react to such motion can be limited by the visibility of the ball, and spectator enjoyment is reduced if the spectator is unable to follow the action. While balls and the like have been provided with decorative accents, and are often marked with league and other official insignia, these markings generally do not contribute to visibility.

Superior visibility can be provided by appropriate selection of object colors and color patterns. For example, objects for use in sports, such as soccer balls or other balls, can comprise an exterior having a first exterior region with a spectral reflectance associated with a first color of a pair of enhanced-visibility colors (EVCs) and a second exterior region associated with a second color of the pair. In representative examples, the first color and the second color are substantially complementary and are associated with a luminance contrast of greater than about 50%. In a particular example, the first color is substantially yellow and the second color is substantially blue. In additional examples, the first exterior region and the second exterior region are substantially non-reflective in a spectral window associated with a background. In representative example, the background is grass or blue sky. In additional examples, the first region and the second region are substantially diffusely reflective.

Balls for team or individual sports comprise a cover having a first color region and a second color region configured to be viewable while the ball is in play. Such regions can be configured to, for example, aid in ball location or estimation of ball rotation and/or speed. The first color region and the second color region have spectral reflectances associated with substantially complementary colors. In a representative example, color space locations of the substantially complementary colors are separated by at least 50% of a chromatic blend limit. In additional examples, a chromatic blend line associated with the complementary colors is separated from a central white color space location by less than 25% of the chromatic blend limit. In further examples, color space locations of the substantially complementary colors are separated by at least 75% of a chromatic blend limit. In other examples, a chromatic blend line associated with the complementary colors is separated from a central white color space location by less than 10% of the chromatic blend limit. In additional examples, substantially complementary colors C1 and C2 are associated with respective CIE L-a-b coordinates $(C1_L, C1_a, C1_b)$ and $(C2_L, C2_a, C2_b)$, wherein a color difference $CD = \sqrt{(C1_a - C2_a)^2 + (C1_b - C2_b)^2}$ is greater than about 50. In further examples, the color difference CD is greater than about 100. In other examples, a total color difference TCD between the first region and the second region is at least about 50 or at least about 100, wherein $TCD = \sqrt{(C1_a - C2_a)^2 + (C1_b - C2_b)^2 + (C1_L - C2_L)^2}$. In additional examples, the substantially complementary colors have a luminance contrast between the first region and the second region of at least 50%.

Methods of selecting colors for a sports item comprise defining a chromatic blend line and selecting a first color location and a second color location on the chromatic blend line, wherein the first color location and the second color location are separated by at least 50% of a chromatic blend limit (CBL). A first color and a second color are selected based on the first color location and the second color location. In a representative example, the chromatic blend line is separated from a central white color space location by less than about 20% of the chromatic blend limit. In additional examples, a color vision deficiency to be accommodated is selected, and the chromatic blend line is selected to be substantially perpendicular to an associated color vision deficiency line of confusion. In further examples, a background spectral window is selected based on an anticipated background for viewing the sports item. A reflectance of at least one of the first color and/or the second color is reduced in at least a portion of the background spectral window. In other examples, the first color and the second color are selected to provide a predetermined luminance contrast.

These and other features are described below with reference to the accompanying drawings.

DETAILED DESCRIPTION

Disclosed below are representative methods and apparatus. The disclosed methods should not be construed as limiting in any way. Instead, the present disclosure is directed toward novel and nonobvious features and aspects of the various disclosed embodiments, alone and in various combinations and subcombinations with one another. The methods and apparatus are not limited to any specific aspects or features, or combinations thereof, nor do the methods and apparatus require that any one or more specific advantages be present or problems be solved.

Although the operations of the disclosed methods and apparatus are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the disclosed flow charts typically do not show the various ways in which the disclosed methods can be used in conjunction with other methods. Additionally, the detailed description sometimes uses terms like "determine" and "provide" to describe the disclosed methods. These terms are high-level abstractions of the actual operations that are performed. The actual operations that correspond to these terms will vary depending on the particular implementation and are readily discernible by one of ordinary skill in the art.

Figure 1A:
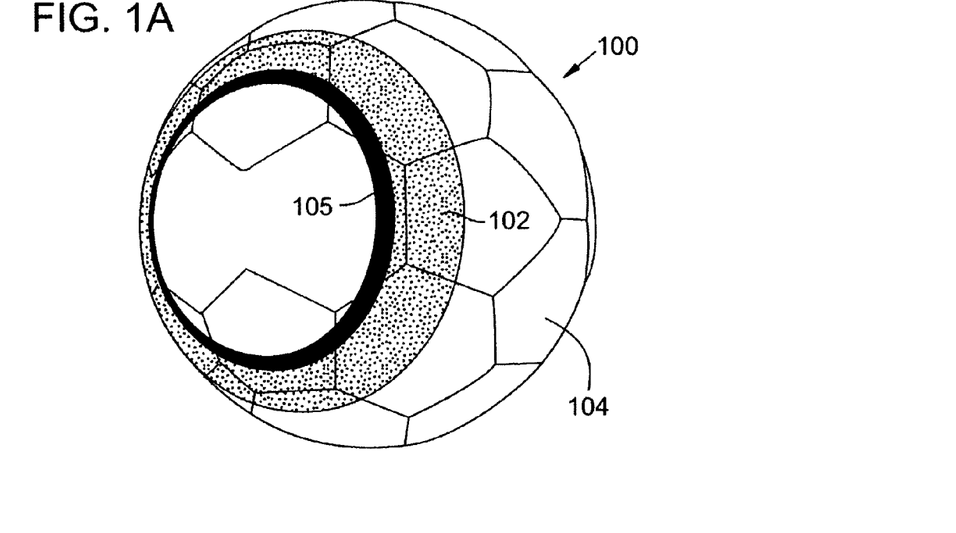
FIGS. 1A–1B illustrate a soccer ball with a cover that has a casing region and a graphic region.
Figure 1B:
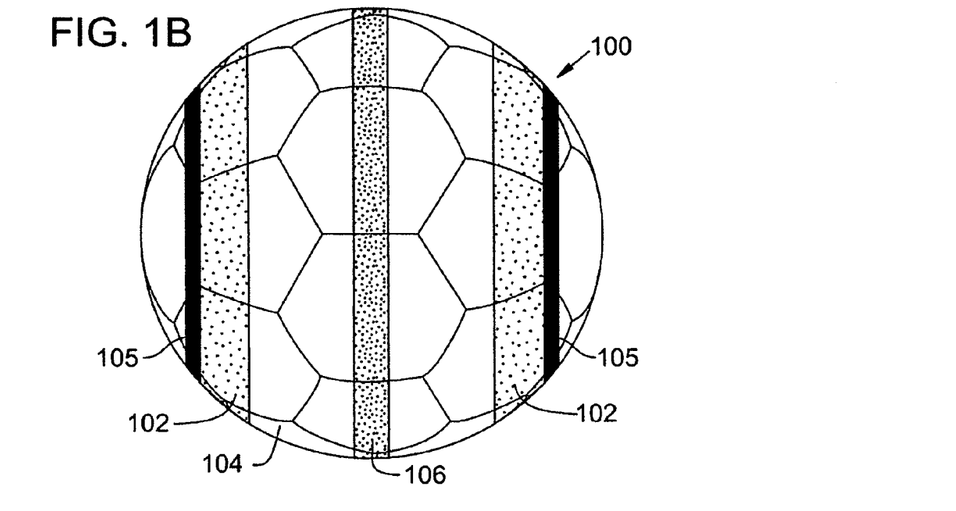

With reference to FIG. 1, a soccer ball 100 comprises an exterior on which a graphic region ("graphic") 102 and a casing region ("casing") 104 are defined. The graphic 102 and the casing 104 can be dyed, coated, or otherwise colored based on respective spectral reflectances to obtain, for example, selected values of hue, value, and intensity. Various patterns can be used, and typically the graphic 102 is selected to be readily noticeable while the soccer ball 100 is in play in contrast to official insignia and manufacturer information that are generally provided to be read only upon close inspection of the soccer ball 100. In other examples, manufacturer information or insignia can be viewable with the ball in play. The graphic 102 is generally a pattern graphic or motion graphic that is selected to enhance player/spectator perception of ball rotation, speed, or other playing characteristic. In the example of FIG. 1, the graphic 102 extends over two or more of the cover segments that combine to define the ball exterior. In some examples, additional graphics are provided, and these additional graphics can be associated with the same or different spectral reflectances. In addition, pattern graphics can be provided in association with one or more axes for perception of ball speed and/or rotation with respect to these axes. As shown in FIGS. 1A–1B, a second graphic 105 is provided that is associated with a spectrally broad, low reflectance, such as black or dark gray. An additional graphic 106 is also provided. The graphic 102 can include a series of alternating colored and black or gray stripes, or can be defined as a single color band. Reflectances of the graphic 102 and the casing 104 can be conveniently described as functions of wavelength over a wavelength range, or alternatively, spectral reflectances can be described using color coordinates such as, for example, CIE tristimulus values X, Y, Z (or related values x, y, z), CIE uniform color space coordinates L, u, v, or other color coordinates or color representations.

During play, a soccer ball such as the ball 100 is kicked, headed, trapped, thrown, and caught so that the velocity of the ball is frequently and rapidly changed. Player attention is directed to the ball, and player ability to track and anticipate these rapid changes in ball movement is important, especially at high performance levels. Ball visibility can be substantially increased with selection of visibility-enhancing colors for the graphic 102 and the casing 104. For example, spectral reflectances (or color coordinates or color characterizations) of the graphic 102 and the casing 104 (and other graphics or cover regions) can be selected to be substantially complementary, or substantially opposite or widely spaced as represented on a chromaticity chart using, for example, CIE tristimulus values or other color coordinates. Color coordinates can be based on a representative illumination source, or a spectral distribution associated with a particular illumination source can be used so that color selection for the graphic 102 and the casing 104 can be based on expected observation conditions. For example, spectral reflectances for a soccer ball can be tailored for nighttime use in consideration of spectral distribution for typical artificial lights sources used in stadiums or other sports facilities. For example, spectral distributions associated with quartz-halogen lamps, metal halide lamps, fluorescent lights, or other artificial illumination sources can be used. Selection of spectral reflectances can be based on a particular illumination source for a particular stadium, or an average of several illumination sources can be used. In addition, spectral reflectances can be selected based on natural light illumination conditions such as bright sunlight, cloud cover, snow, rain, fog, or other illumination conditions that are encountered at a particular location. For example, bright sunlight illumination may be appropriate for a soccer pitch in a sunny climate, while cloud cover may be appropriate for rainier climates. However, spectral reflectances can also be selected based on an average illumination for use in a variety of illumination conditions.

Figure 2A:
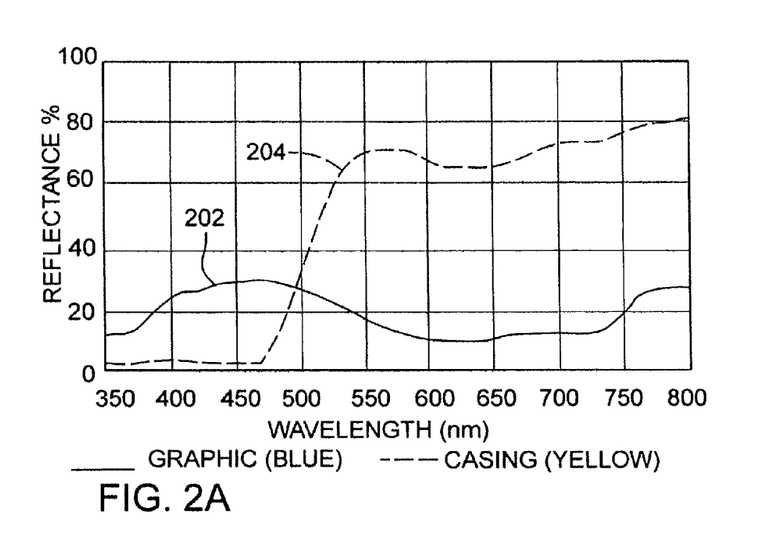
FIG. 2A is a graph of casing reflectance and graphic reflectance as functions of wavelength for a representative color selection for the soccer ball of FIGS. 1A–1B.
Figure 2B:
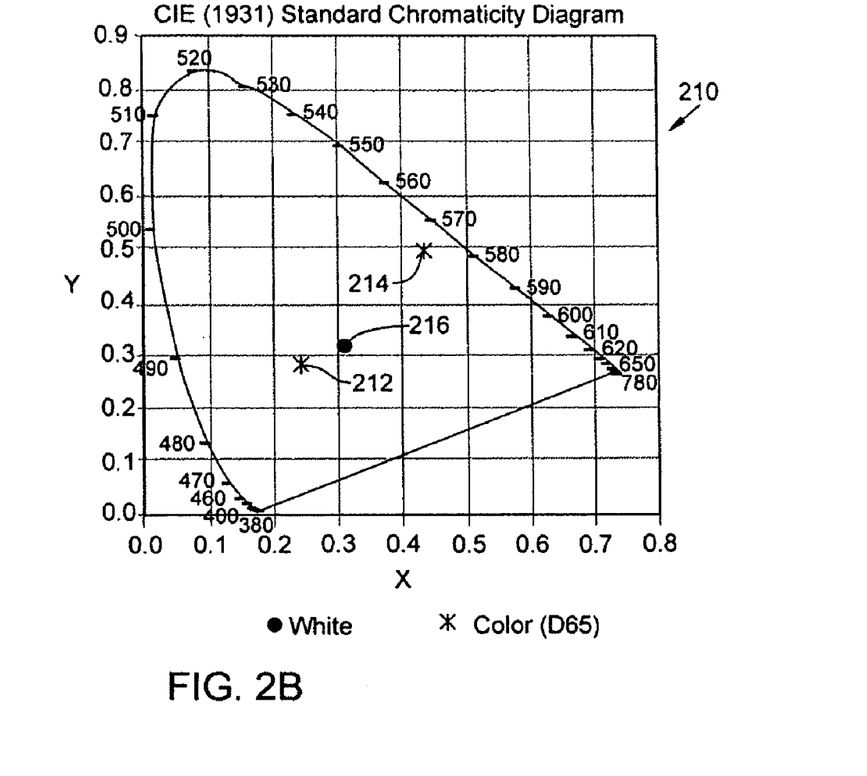
FIG. 2B is a graph illustrating CIE color coordinates associated with the reflectances of FIG. 2A as illuminated by bright sunlight.
Figure 2C:
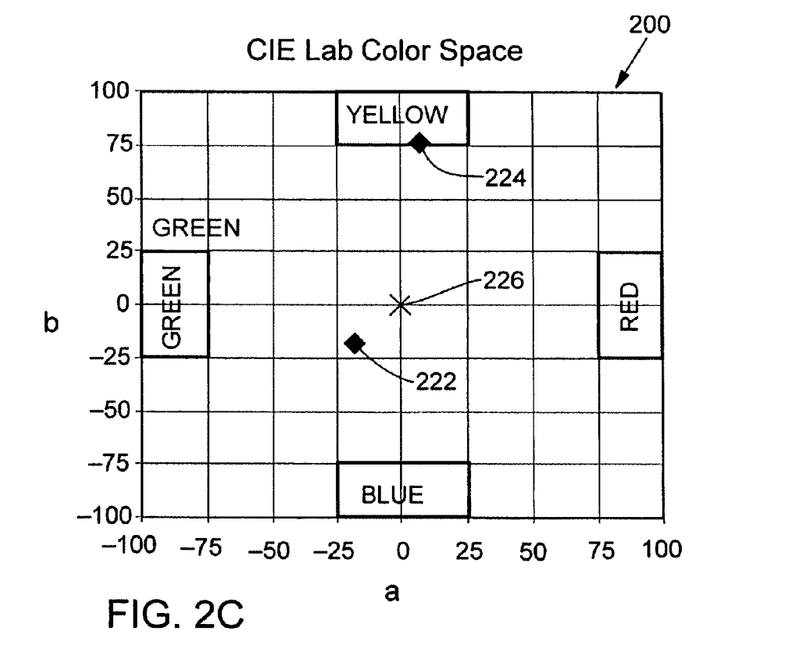
FIG. 2C is a graph illustrating CIE L-a-b color coordinates associated with the color coordinates of FIG. 2B.

A representative selection of visibility-enhancing coloration for the soccer ball 100 is illustrated in FIGS. 2A–2C. Referring to FIG. 2A, a graphic reflectance 202 and a casing reflectance 204 are selected that appear blue and yellow, respectively. CIE X-Y coordinate locations 212, 214 associated with the graphic reflectance and the casing reflectance, respectively, as illuminated by sunlight are shown in a CIE standard chromaticity diagram 210 in FIG. 2B. For reference, a location 216 of a standard white (sunlight or illuminant D65) is also shown. The CIE Z-coordinate that is associated with a total reflectance or luminance is not shown on the chromaticity diagram 210. The locations 212, 214 are widely separated and are opposite with respect to the location 216. CIE L-a-b color coordinates associated with the reflectances 202, 204 are shown in FIG. 2C as locations 222, 224, respectively on an L-a-b representation 220. The locations 222, 224 are widely separated and opposite with respect to a location 226 associated with white illumination, but in other examples, colors associated with color coordinates that are not opposite with respect to the location 226 can be used. In FIG. 2C, an L-a-b luminance coordinate L is not shown.

Color selection and characterization can be conveniently described based on a CIE L-a-b Color Space. A Total Color Difference (TCD) between colors having coordinates ($L_1$, $a_1$, $b_1$) and ($L_2$, $a_2$, $b_2$) in such a color space can be defined as TCD=$\sqrt{(a_1-a_2)^2+(b_1-b_2)^2+(L_1-L_2)^2}$. A Color Difference (CD) under isoluminant conditions, i.e., assuming identical brightnesses of the colors, can be defined as CD=$\sqrt{(a_1-a_2)^2+(b_1-b_2)^2}$. In a CIE Lab Color Space, complementary colors can b associated with color coordinates along any axis that passes through or near a central "white" point. Horizontal, vertical, or other axes can be used. For example, a vertical axis is associated with blue/yellow, a horizontal axis is associated with red/green, and oblique axes through opposite corners of an L-a-b coordinate systems are associated with orange/blue-green and purple/green-yellow. Luminance contrast be calculated using a spectral reflectance function SRF($\lambda$) (reflectance as a function of wavelength $\lambda$) of an object with respect to a particular light source. For the examples presented herein, a light source having a spectral distribution D65($\lambda$) and similar to sunlight is used. In addition, a human spectral sensitivity function HSSF($\lambda$) is used. Object luminance coordinate L can be calculated as:

$$L = \frac{\int SRF(\lambda)D65(\lambda)HSSF(\lambda)d\lambda}{\int D65(\lambda)HSSF(\lambda)d\lambda}.$$

Luminance contrast for objects having luminances $L_1$ and $L_2$ can be calculated as $|(L_1-L_2)/L_1|$, wherein $L_1 > L_2$.

Color contrast can be associated with a distance between the locations 222, 224 on the L-a-b space representation 220, and a color difference can be associated with a total distance between the locations 222, 224. For example, colors C1 and C2 that are associated with respective CIE L-a-b coordinates ($C1_L$, $C1_a$, $C1_b$) and ($C2_L$, $C2_a$, $C2_b$), can be associated with a color difference CD=$\sqrt{(C1_a-C2_a)^2+(C1_b-C2_b)^2}$, and in typical examples enhanced-visibility colors (EVCs) have color differences of greater than about 50, or greater than about 75, or greater than about 100. In other examples, a total color difference TCD between colors C1 and C2 is at least about 100, wherein TCD=$\sqrt{(C1_a-C2_a)^2+(C1_b-C1_b)^2+(C1_L-C2_L)^2}$. In additional examples, the substantially complementary colors have a luminance contrast of the first region and the second region of at least 50%. In other examples, color contrast can be associated with horizontal or other separations in an L-a-b representation.

Color differences associated with FIGS. 2A–2C are summarized in Table 1. CIE dominant wavelengths for the graphic and the casing reflectances of FIG. 2A are approximately 482 nm (blue) and 572 nm (yellow), respectively. Luminance contrast is about 70% and color difference (CD) is about 98. Total color difference (TCD) is about 103.

TABLE 1

Color coordinates associated with the spectral reflectances of FIG. 2A.

| Color Coordinates | Graphic (Faded Blue) | Casing (Greenish-Yellow) |
|---|---|---|
| x | 0.2394 | 0.4356 |
| y | 0.2646 | 0.4901 |
| z | 0.4960 | 0.0743 |
| L | 48.51 | 81.22 |
| a | −18.45 | 6.64 |
| b | −18.14 | 76.58 |

Selection of complementary colors for a soccer ball graphic and casing as described above can offer significant visual contrast, but such complementary color contrast can be further enhanced by selection of contrasting total reflectances that can be associated with luminance values of, for example, the graphic and the casing. In addition, selection of contrasting graphic/casing colors can provide aesthetically superior visual appearance of, for example, a soccer ball or other item. In addition, selection of these contrasting colors can be based on an anticipated use environment. For example, for a soccer ball that is to be used in matches played on natural grass pitches, colors are preferably selected to enhance mutual contrast between the ball and the grass pitch. In other examples, contrast based on a different background such as blue sky, cloud cover, stadium seating, or other immediate surround to a playing surface such as trees, playground structures, or spectator clothing can be selected.

Figure 3A:
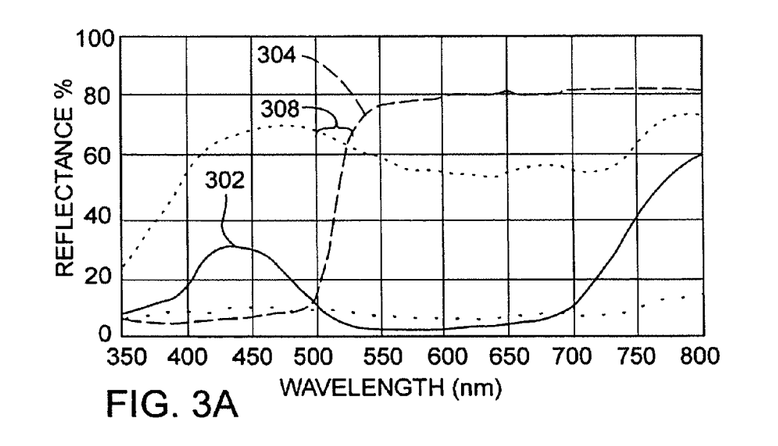
FIG. 3A is a graph of casing reflectance and graphic reflectance as functions of wavelength for a representative color selection of the soccer ball of FIGS. 1A–1B.
Figure 3B:
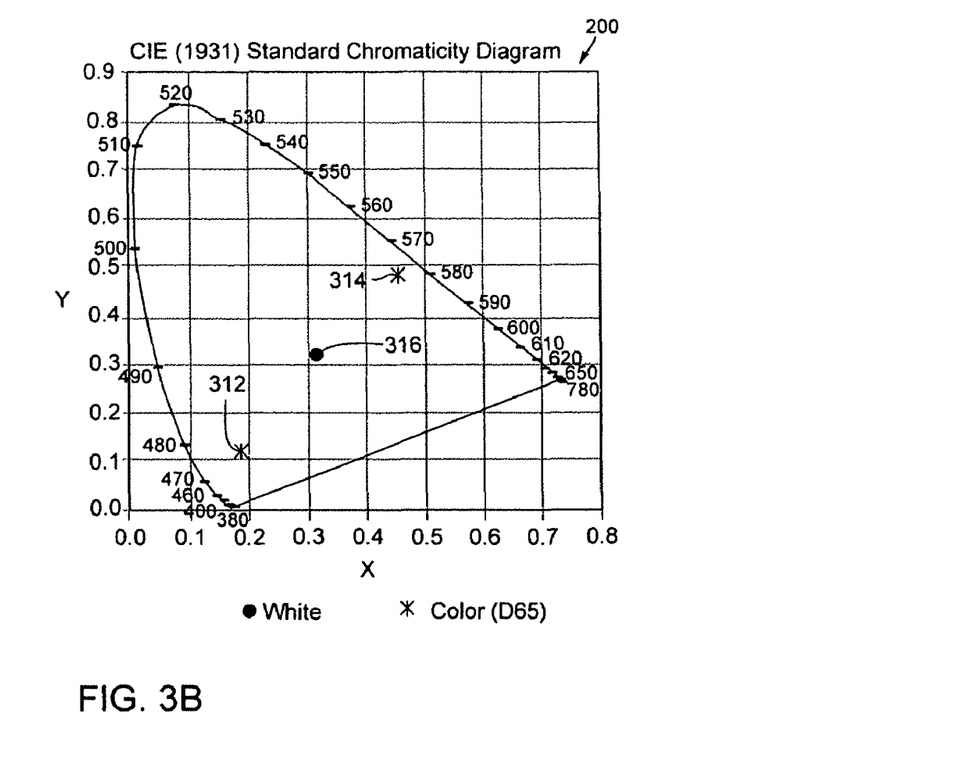
FIG. 3B is a graph illustrating CIE color coordinates associated with the reflectances of FIG. 3A as illuminated by bright sunlight.
Figure 3C:
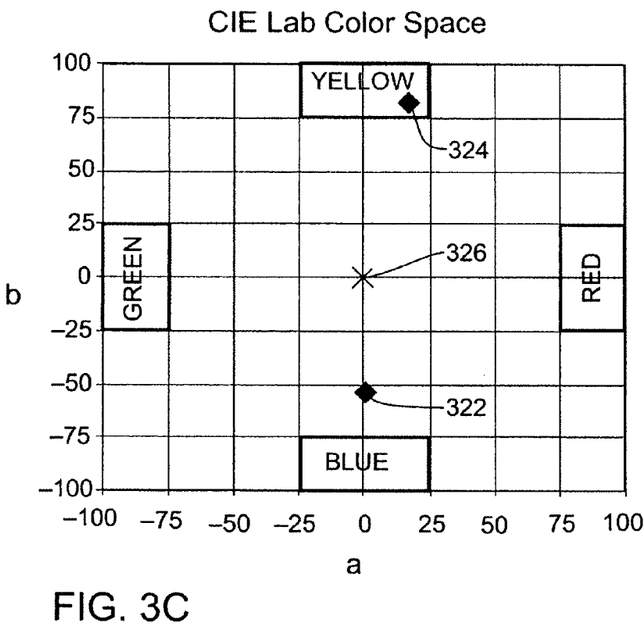
FIG. 3C is a graph illustrating CIE L-a-b color coordinates associated with the color coordinates of FIG. 3B.

A representative selection of visibility-enhancing coloration based on these additional considerations is illustrated in FIGS. 3A–3C. Referring to FIG. 3A, a graphic reflectance 302 and a casing reflectance 304 are selected that appear blue and yellow, respectively. The reflectance curves 302, 304 are configured so that a spectral window 308 is defined in which neither the graphic 102 nor the casing 104 have reflectances that are reduced. Typically such reduced reflectances are less than about 50%, 25%, or 10%. As shown in FIG. 3A, the spectral window 308 is located in a spectral region associated with green to enhance the appearance of the ball 100 on a typical green (grass) soccer pitch. CIE X-Y coordinate locations 312, 314 associated with the graphic reflectance and the casing reflectance, respectively, as illuminated in sunlight illumination are shown in a CIE standard chromaticity diagram 310 in FIG. 3B. For reference, a location 316 of a standard white illuminant (similar to sunlight) is also shown. The CIE Z-coordinate that is associated with total reflectance or luminance is not shown on the chromaticity diagram 310. The locations 312, 314 are widely separated and are opposite with respect to the location 316. CIE L-a-b color coordinates associated with the reflectances 302, 304 are shown in FIG. 3C as locations 322, 324, respectively. The locations 322, 324 are widely separated and opposite with respect to a location 326 associated with white illumination. A luminance coordinate is not shown. Color contrast can be associated with a distance between the locations 322, 324 on the L-a-b space representation, and total color difference associated with a total distance between the locations 322, 324 including differences associated with L-a-b color space L-coordinates.

Color coordinates (x-y-z and L-a-b) based on the spectral reflectances of FIG. 3A are listed in Table 2. The CIE dominant wavelengths for the graphic and the casing are approximately 465 nm (blue) and 575 nm (yellow), respectively. Luminance contrast is about 93% and color difference (CD) is about 134. Total color difference (TCD) is about 147.

TABLE 2

Color coordinates associated with the spectral reflectances of FIG. 3A.

| Color coordinates | Graphic (Blue) | Casing (Yellow) |
|---|---|---|
| x | 0.1859 | 0.4559 |
| y | 0.1127 | 0.4771 |
| z | 0.7014 | 0.0670 |
| L | 24.78 | 84.03 |
| a | 0.41 | 17.11 |
| b | −52.29 | 80.63 |

Figure 4:
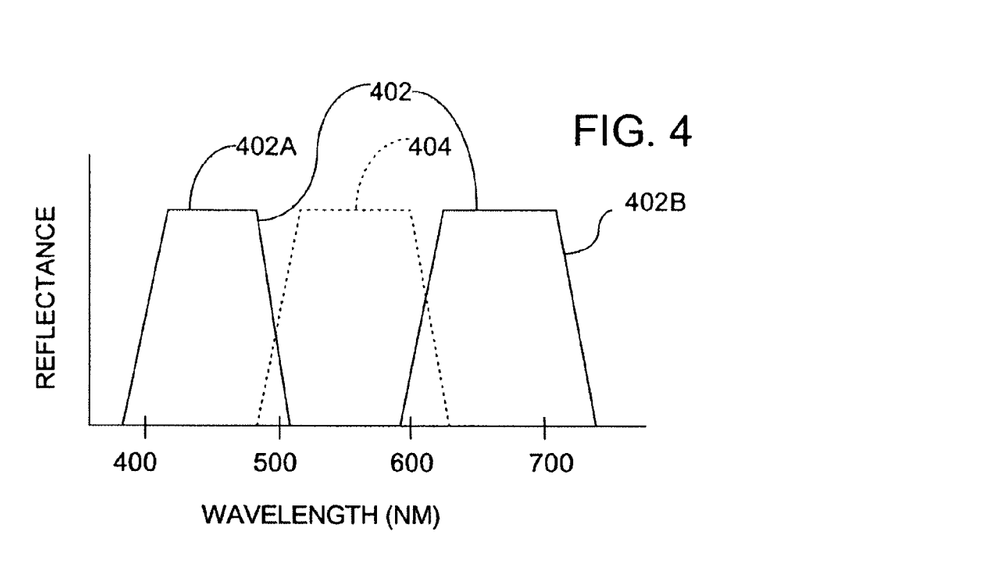
FIGS. 4–5 contain graphs of reflectance as a function of wavelength for additional representative examples of enhanced-visibility colors.
Figure 5:
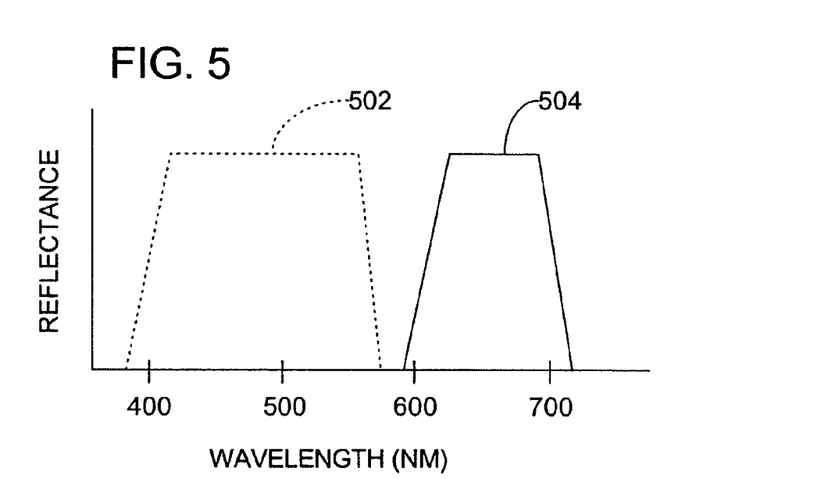
Figure 6:
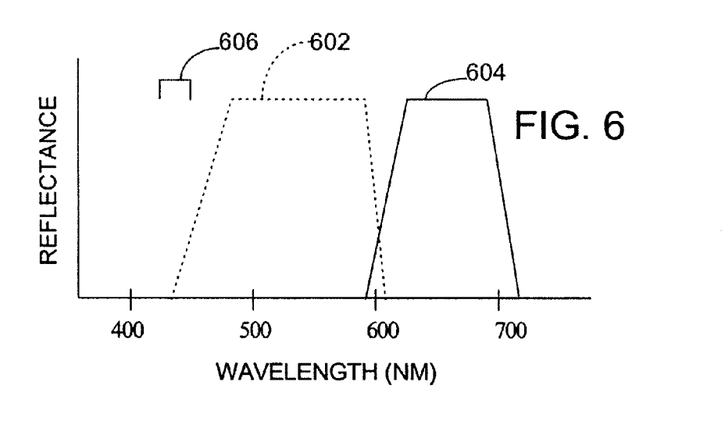
FIG. 6 contains graphs of reflectance as a function of wavelength for an additional representative example, wherein enhanced-visibility colors are selected based on a background spectrum.

Additional representative examples of complementary spectral reflectances are illustrated in FIGS. 4–6. FIG. 4 illustrates spectral reflectances 402, 404 associated with magenta and green, respectively. The reflectance 402 includes portions 402A, 402B associated with substantial reflectance values in blue and red wavelength ranges, respectively. Spectral reflectances such as the reflectances 402, 404 can be used to enhance visibility. FIG. 5 illustrates spectral reflectances 502, 504 associated with cyan and red, respectively. In this example, the spectral reflectances 502, 504 do not overlap in a spectral window at about 580 nm. This spectral window can be associated with a background such as a playing surface, or can be associated with spectral characteristics of selected coloring materials. Spectral reflectances such as the reflectances 502, 504 can also be used to enhance visibility. Additional suitable reflectances 602, 604 associated with blue and yellow, respectively, are shown in FIG. 6. The reflectances 602, 604 lack appreciable reflectivity at wavelengths less than about 450 nm and are therefore appropriate for defining colors on a ball to be used against a blue background, although such colors can be used with other backgrounds as well. As used herein, appreciable reflectivity refers to reflectivities greater than about 20%, 50%, or 75%.

Figure 7A:
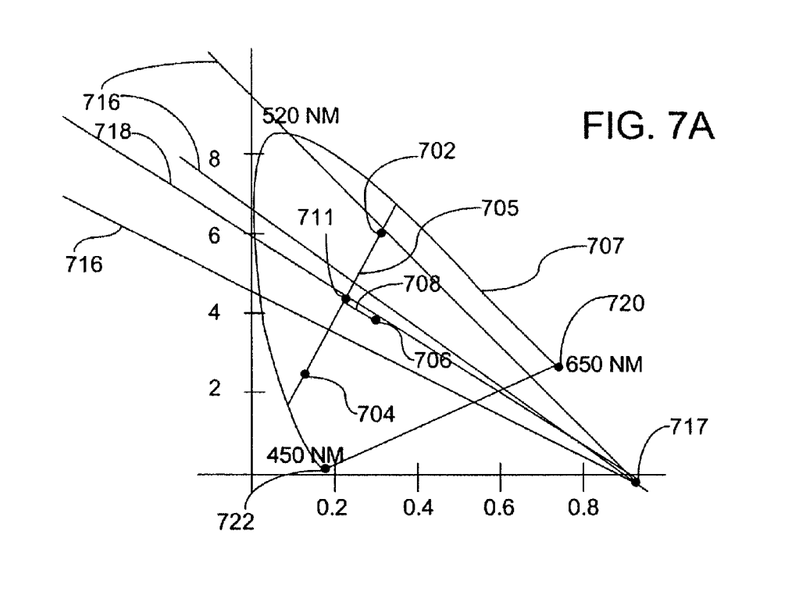
FIG. 7A is a diagram of a CIE chromaticity curve illustrating selection of enhanced-visibility colors.

Graphic/casing colors associated with enhanced visibility can be selected to be substantially complementary or "opposing" as shown on a CIE plot. In some color representations, equal separations as graphed do not correspond to equal or even approximately equal perceived color differences. For example, so-called MacAdam ellipses of varying sizes and eccentricities can be used to characterize "just noticeable differences" (JND) in perceived colors as a function of coordinate location on the standard CIE chromaticity diagram. Representative methods for selecting enhanced visibility color combinations can be described with reference to FIG. 7A. For convenience, a length of a chromatic blend line 705 connecting locations 702, 704 associated with selected enhanced visibility colors and extending to a CIE curve boundary 707 can be referred to as a chromatic blend limit (CBL). The CBL is associated with colors at the CIE curve boundary 707 and can therefore be associated with an available color space. Colors can be selected so that the corresponding separations on a CIE graph are greater than about 90%, 75%, or 50% of the CBL In addition to selecting colors having a predetermined CIE color space separation, colors are generally selected to be substantially opposite with respect to a color space location 706 associated with white. Typically, a length of a line 708 from the white location 706 perpendicular to the chromatic blend line 705 is less than about 50%, 25%, 15%, or 10% of the CBL. In addition, selected colors on the chromatic blend line 705 are on opposite sides of an intersection 711 of the chromatic blend line 705 and the line 708. Enhanced-visibility color sets of two or more colors can be similarly selected using other color space representations as well, and the representation of FIG. 7A is only one convenient representation.

Colors and combinations that are appropriate even for so-called color deficient individuals (commonly known as "color blind" individuals) can be similarly selected. Referring further to FIG. 7A, a series of color confusion lines 716 associated with colors that are typically confused by individuals exhibiting deuteranopia or deuteranomaly extend from a deutan origin 717. Color combinations along the lines 716 are preferably avoided for such individuals. As is apparent, colors associated with the locations 702, 704 are well suited for such individuals as the chromatic mixing line 705 connecting these points is approximately perpendicular to a deutan confusion line 718 extending through the white point 706. Such a confusion line can be referred to as a central confusion line so that the deutan confusion line 718 can be referred to as a deutan central confusion line. Color confusion is generally avoided with chromatic blend lines are substantially perpendicular to a central confusion line, this is, that intersect central confusion lines at angles greater than 60 degrees, greater than 70 degrees, greater than 75 degrees, or greater than 80 degrees. In some examples, the angle of intersection is at least 85 degrees. While deutan (red-green color deficiency) is the most common form of color deficiency and is therefore desirably compensated in color selection, additional forms of color deficiency such as protan (red-green) or tritan (yellow-blue) color deficiency can be compensated using lines of confusion that originate from a protan origin 720 or a tritan origin 722, respectively.

Selected color coordinates can serve as a guide in dye or pigment selection, and actual ball colors can differ. For example, dyes that are satisfactory with respect to durability, cost, fading, or other factors may be unavailable. In addition, enhanced-visibility colors can be modified for aesthetic reasons to, for example, coordinate with player uniforms or team colors, or for other reasons. In some examples, actual colors deviate from associated target color coordinates to trade-off color vision correction, luminance contrast, or other design goals. Fluorescent agents can also be included to enhance overall ball luminance as well as to provide additional luminance at selected wavelengths.

Figure 7B:
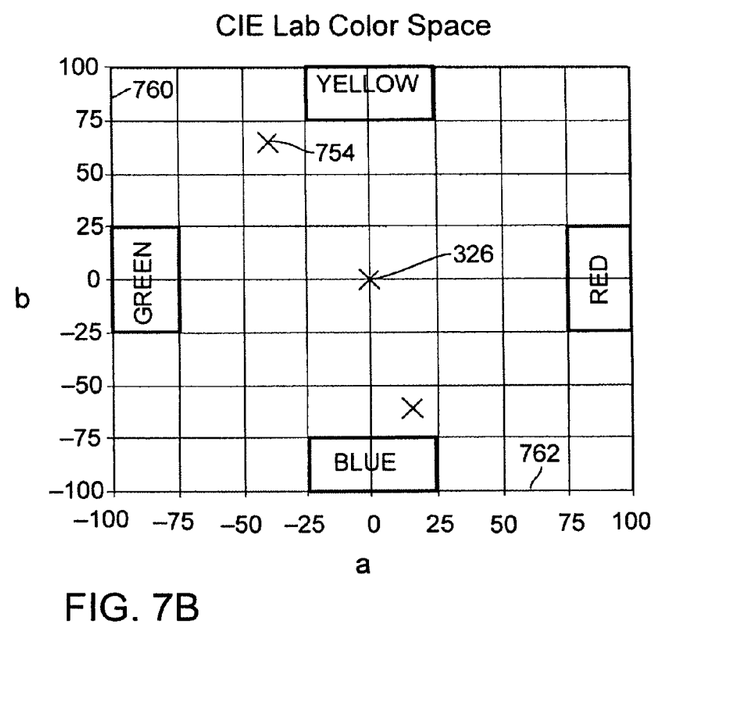
FIG. 7B is a diagram of a CIE L-a-b color space illustrating selection of enhanced-visibility colors.

CIE L-a-b coordinates can also be used in enhanced-visibility color (EVC) selection. Referring to FIG. 7B, locations 752, 754 can be associated with selected EVCs. For example, suitable EVC pairs such as the pair associated with the locations 752, 754 are defined by L-a-b locations that are separated along a b-axis 760 by at least 50, 75, 100, 125, or 150 units. In some examples, at one location is associated with a negative b-value and one location is associated with a positive b-value. In other examples, locations are separated along an a-axis 762 by at least 50, 75, 100, 125, or 150 units, and in particular examples, one location is associated with a negative a-value and one location is associated with a positive a-value. In other examples, a color difference (CD) is selected that is greater than about 50, 75, 100, 125, or 150 units without regard for a particular axis.

Figure 8:
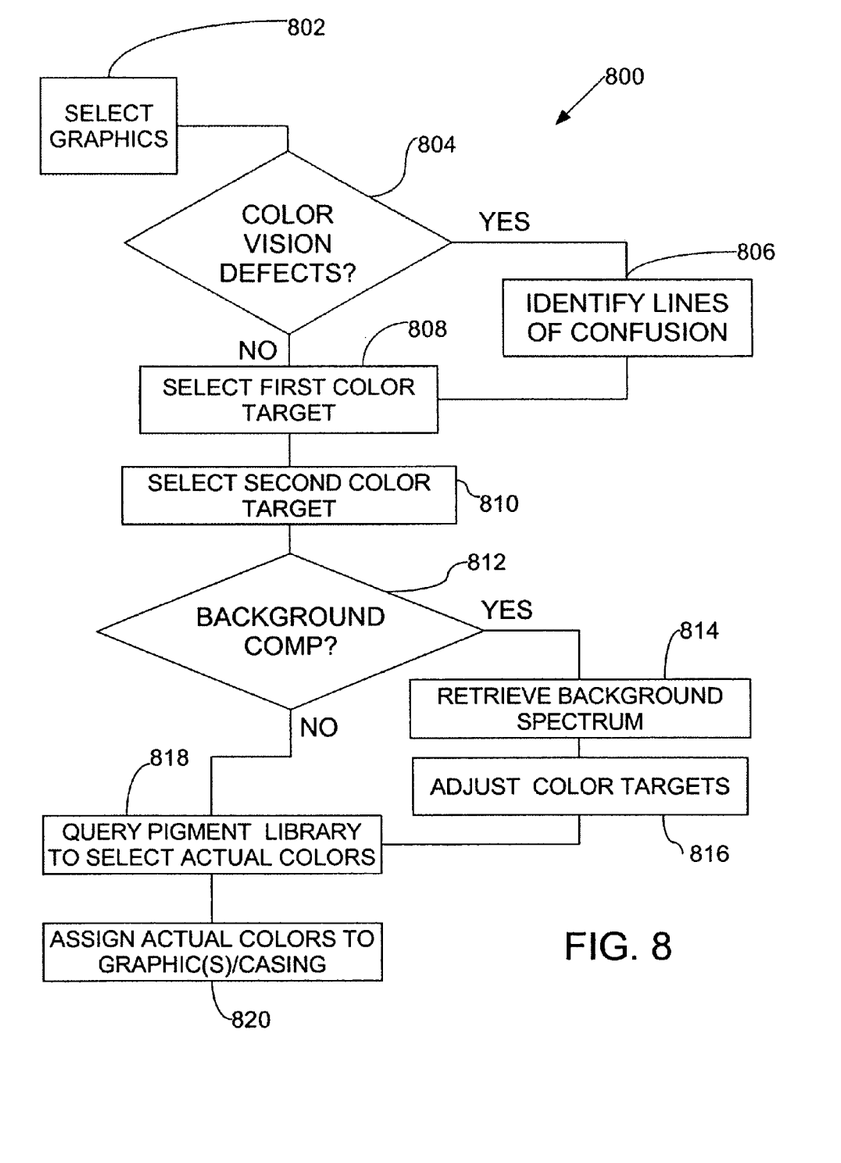
FIG. 8 is illustrates a representative method of selecting enhanced-visibility colors that can avoid color combinations associated with, for example, color confusion associated with a color deficiency.

With reference to FIG. 8, a representative method 800 for selecting, for example, a casing color and a graphic color includes selecting or defining a graphic region and a casing region in a step 802. In a step 804, a determination of whether color selection is to include consideration of color vision defects is made. If, for example, avoidance of colors confused by some individuals due to a color deficiency is desired, lines of confusion can be identified in a step 806 so that such colors can be identified or avoided. In other examples, colors and color combinations inappropriate for color deficient individuals can be identified in other ways. In steps 808, 810, first and second target colors are selected based on, for example, CIE coordinates as shown in FIGS. 7A–7B, or using another method. In a step 812, a determination of whether a background such as grass, sky, clouds, or other background is to be considered is made. If so, a background spectrum is retrieved from a database in step 814, and the first and second target colors are modified based on the background spectrum in a step 816. A pigment library is queried in a step 818, and pigments are assigned to, for example, a casing and a graphic in a step 820. Alternatively, colors can be selected based on PANTONE colors.

Figure 9:
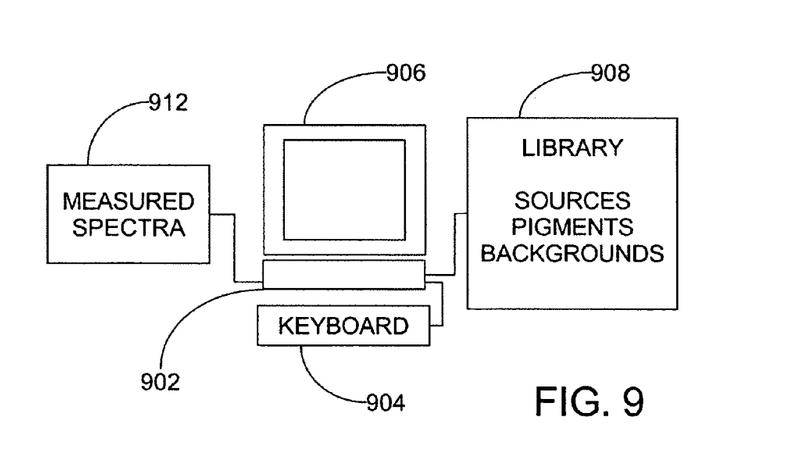
FIG. 9 is a schematic diagram of a representative computer system configured to select colors based on a method such as that of FIG. 8.

A representative apparatus for selecting enhanced visibility colors is illustrated in FIG. 9. A computer 902 such as a personal computer or a workstation is in communication with a keyboard 904 and a display 906. A computer readable medium 908 such as a hard disk, floppy disk, CD-ROM, RAM, or other medium is configured for storage and retrieval of a data library that can include spectral data associated with, for example, illumination sources, backgrounds such as playing or stadium surfaces, cloud cover, open sky, and pigments or other colorings that can be used. Measured spectra can be provided via a spectrometer 912 that is configured to acquire additional spectral data as well as measure color combinations as realized so that design and actual color coordinates can be compared. The computer readable medium 908 can be remote from the computer 902, and can communicate with the computer via a local area network (LAN) or a wide area network (WAN) such as the Internet. Computer executable instructions for performing EVC selection can be stored on memory in the computer 902 or on computer readable media external to the computer 902.

While examples are described above based on particular color representations, in other examples, color representations based on red-green-blue (RGB), cyan-magenta-yellow (CMY), hue-saturation-brightness (HSB), CIE XYZ, CIE xyz, CIE L a b, CIE L u v, Munsell, or other representations can be used. In addition, representative examples described above are based on configuring colors and graphics on a soccer ball, but other examples include balls or similar objects for other sports such as baseball, volleyball, softball, cricket, tennis, lacrosse, hockey, football, skeet shooting, and other sports. Exterior portions of a soccer ball are typically referred to as a casing or casing region, and a graphic or graphic region as used herein. For other balls or objects, first and second exterior regions can be selected and EVCs associated with these regions. For convenience, sporting objects such as balls, pucks, disks, and the like can be referred to as balls. Many other types of objects can be similarly ornamented and colored, and such treatment is particularly useful for objects to be tracked while in motion or during acceleration. In addition, player clothing and apparatus can be similarly configured based on EVCs as described above. Alternatively, visibility can be suppressed by avoiding EVC combinations. Balls and other objects and apparatus for sports are typically more comfortably viewed if their surfaces exhibit diffuse, not specular reflectance, as specular reflectance can be associated with glare from, for example, stadium lighting or the sun. EVCs can also be configured to provide luminance contrast.

It will be apparent that the examples described above can be modified in arrangement and detail without departing from the scope of the disclosure. These examples are not to be taken as limiting, and we claim all that is encompassed by the appended claims and equivalents.

We claim:

1. A sporting object for use while in motion with an exterior surface, the exterior surface comprising:
a casing region having a luminance $L_1$; and
a graphic region having a luminance $L_2$, wherein the graphic region includes a pattern graphic, the pattern graphic being provided in association with one or more axes for perception of ball rotation with respect to the one or more axes;
wherein the casing region has a spectral reflectance associated with a first color of a pair of enhanced visibility colors (EVCs) and the graphic region has a spectral reflectance associated with a second color of the pair, the first color of the pair and the second color of the pair having representations on a CIE (1931) Standard Chromaticity Diagram that are offset in opposing directions from a representation of white with an expected illumination source used during competition,
wherein the luminance contrast between $L_1$ and $L_2$ is greater than about 50%, and wherein the casing region and the graphic region are substantially non-reflective in a spectral window associated with a background for viewing the ball during competition.

2. The object of claim 1, wherein the first color and the second color are substantially complementary.

3. The object of claim 1, wherein the first color is substantially yellow and the second color is substantially blue.

4. The object of claim 1, wherein the background is grass.

5. The object of claim 1, wherein the background is an immediate surround to a playing surface.

6. The object of claim 1, wherein the background is blue sky.

7. The object of claim 1, wherein the casing region and the graphic region are substantially diffusely reflective.

8. The sporting object of claim 1, wherein the graphic region includes two or more pattern graphics that are circular bands parallel to each other.

9. The sporting object of claim 8, wherein the first color is substantially yellow and the second color is substantially blue.

10. The sporting object of claim 9, wherein the sporting object is a soccer ball.

11. The soccer ball of claim 10, wherein the first color is associated with a reflectance of greater than about 60% at visible wavelengths greater than about 525 nm and less than about 5% at visible wavelengths shorter than about 460 nm.

12. A soccer ball for use in play with an exterior, the exterior comprising:
a casing region having a luminance $L_1$; and
a graphic region having a luminance $L_2$, wherein the graphic region includes a motion graphic selected to enhance perception of the rotation of the ball;
wherein the casing region and the graphic region have spectral reflectances with an expected illumination source used during competition defined by substantially complementary colors, wherein the CIE (1931) Standard Chromaticity Diagram locations of the substantially complementary colors are offset in opposing directions from the location of white and are separated by at least about 50% of a chromatic blend limit,
wherein the luminance contrast between $L_1$ and $L_2$ is at least about 50%, and
wherein the substantially complementary colors are substantially non-reflective in a spectral window associated with a background for viewing the ball during competition.

13. The ball of claim 12, wherein a chromatic blend line associated with the complementary colors is separated from a central white color space location by less than about 25% of the chromatic blend limit.

14. The ball of claim 12, wherein color space locations of the substantially complementary colors are separated by at least about 75% of a chromatic blend limit.

15. The ball of claim 14, wherein a chromatic blend line associated with the complementary colors is separated from a central white color space location by less than about 25% of the chromatic blend limit.

16. The ball of claim 15, wherein a chromatic blend line associated with the complementary colors is separated from a central white color space location by less than about 10% of the chromatic blend limit.

17. The ball of claim 12, wherein the substantially complementary colors are associated with respective coordinates C1, C2 in an L-a-b color coordinate system, wherein a color difference is greater than about 50.

18. The ball of claim 17, wherein an L-a-b color space a-coordinate of one of C1 and C2 is greater than zero and an L-a-b color space a-coordinate of the other of C1 and C2 is less than zero.

19. The ball of claim 17, wherein an L-a-b color space b-coordinate of one of C1 and C2 is greater than zero and an L-a-b color space b-coordinate of the other of C1 and C2 is less than zero.

20. The ball of claim 17, wherein the color difference is greater than about 100.

21. The ball of claim 12, wherein a total color difference (TCD) of the casing region and the graphic region is at least about 100.

22. The ball of claim 12, wherein the motion graphic includes a first portion and a second portion associated with a first axis and a second axis, respectively.

23. The ball of claim 21, wherein the total color difference (TCD) between two colors C1 and C2 is calculated based on the equation:

$$TCD = \sqrt{(C1_a - C2_a)^2 + (C1_b - C2_b)^2 + (C1_L - C2_L)^2},$$

wherein C1 has coordinates ($C1_L$, $C1_a$, $C1_b$) and C2 has coordinates ($C2_L$, $C2_a$, $C2_b$) in CIE L-a-b coordinates, respectively, and further wherein TCD is greater than 100.

* * * * *